United States Patent Office 3,539,660
Patented Nov. 10, 1970

3,539,660
METHOD OF PREPARING A THERMOSET COMPOSITION BASED ON CARBOXY COPOLYMERS, EPOXIDES, AND BICYCLIC FUSED TERTIARY AMINES
Darrell D. Hicks and Gene E. Schroll, Louisville, Ky., assignors to Celanese Coatings Company, New York, N.Y., a corporation of Delaware
No Drawing. Filed July 28, 1967, Ser. No. 656,675
Int. Cl. C08g 45/04
U.S. Cl. 260—837    5 Claims

ABSTRACT OF THE DISCLOSURE

A method for preparing a thermoset composition based on carboxy polymers and epoxides in the presence of a catalytic amount of a bicyclic fused ring amine at relatively low temperatures.

---

This invention relates to a method for preparing a thermoset composition cured at relatively low temperatures. More particularly, the invention is directed to a method for preparing a thermoset composition based on carboxy polymers and epoxides in the presence of a catalytic amount of bicyclic fused ring amine capable of being cured at relatively low temperatures.

It is known that if thermoset compositions based on carboxy copolymers and epoxides are cured at low temperatures, coating compositions of improved hardness, mar resistance, impact resistance and solvent resistance are obtained. Techniques for obtaining these desirable coating compostions are described in U.S. Pat. 3,305,601 wherein aliphatic tertiary amines, such as trimethylamine, triethylamine and the like, and quaternary ammonium compounds are preferred since they do not enter into the reaction. Other catalysts are being sought to provide the same effect with a minimum reaction of the catalyst and yet providing the improved coating properties.

It has now been discovered that a thermoset composition based on carboxy polymers and epoxide can be cured at relatively low temperatures in the presence in catalytic amounts of a bicyclic fused ring amine containing only carbon, hydrogen and nitrogen and having a nitrogen atom in at least one of the bridge-head positions, said nitrogen atom being connected to three different saturated carbon atoms and bearing an unshared pair of electrons. The bicyclic fused ring amine is an ideal catalyst for this low temperature curing technique since the amine groups are fused into the compound and not readily available for interaction with the polymers. At the same time, the bicyclic fused ring amine catalyst used to produce thermoset compositions based on carboxy polymers and epoxide, have improved properties and advantages over similar compositions produced using catalysts such as quaternary ammonium compounds and other amines. These improved properties and advantages of the coatings include faster task free time, improved resistance properties and the like.

In this invention, carboxy copolymers are prepared containing at least about 20 percent and preferably about 30 percent by weight carboxylic acid of that used to prepare the copolymer based on the weight of the copolymer and the copolymer is reacted with a polyepoxide to produce insoluble thermosetting compositions and films.

The carboxy polymers reacted with polyepoxides according to the present invention are formed by combining a polymerizable ethylenically unsaturated monomer with acrylic acid, methacrylic acid, or crotonic acid, i.e., alpha-beta unsaturated monocarboxylic acids having a single double bond and not more than four carbon atoms.

Copolymerized with the alpha-beta unsaturated acids are ethylenically unsaturated monomers copolymerizable therewith. Particularly important are vinyl aromatic compounds, for instance, styrene, the halostyrenes, etc., having a single vinyl group and free of other substituents capable of reacting with an unsaturated acid, i.e., a monofunctional vinyl aromatic compound. Also valuable are saturable alcohol esters of acrylic, methacrylic and crotonic acids. Examples of monofunctional vinyl aromatic monomers are isopropenyl toluene, the various dialkyl styrenes, ortho-, meta-, and para-chloro styrenes, bromo styrenes, and fluoro styrenes, the cyano styrenes, and vinyl naphthalene. Among other monomers are the various alpha-substituted styrenes, e.g., alpha-methyl styrenes and alpha-methyl paramethyl styrenes. Acrylic, methacrylic, and crotonic esters of saturated alcohols include the methyl, ethyl, propyl, isopropyl, n-butyl, isobutyl, (sec.) butyl, (tert.) butyl, amyl, hexyl, heptyl, octyl, decyl, dodecyl, etc. esters of acrylic, methacrylic and crotonic acids. Preferred monomers include these alpha-beta unsaturated monocarboxylic acid esters of saturated monohydric alcohols, the acids having not more than 4 carbon atoms and the alcohols having not more than 20 carbon atoms and monofunctional vinyl aromatic compounds since, as will be shown, resulting films are more flexible.

Other known monomers which can be used in the preparation of the carboxy-polymer as is well known in the art include vinyl aliphatic cyanides of not more than four carbon atoms, for example, acrylonitrile and methacrylonitrile. Unsaturated monohydric alcohol esters of saturated monocarboxylic acids are also intended wherein the alcohols contain a single double bond and not over three carbon atoms, and the acids have not more than twenty carbon atoms, for instance, vinyl acetate, vinyl stearate, and the allyl, methallyl, and crotyl esters of propionic, butyric and other acids. And, of course, not only the monomers themselves, but mixtures of the monomers can be copolymerized with the alpha-beta unsaturated acids to form the carboxy polymer. A desirable polymer includes acrylic acid, methyl methacrylate, and vinyl toluene, the desideratum being that the unsaturated acid is present in an amount of about 20 percent by weight or more based on the total copolymer weight. Thus, based on 100 parts by weight of monomers, an amount above about 20 parts are acrylic or other acid and the remaining parts by weight are one or more of the other monomers mentioned hereinbefore.

Since carboxy polymers are well known, their preparation need not be discussed at length herein. Polymerization is effected by conventional solution polymerization techniques using a peroxide catalyst such as benzoyl or ditertiary butyl peroxide and a temperature usually between about 15° C. to 130° C. Suitable solvents are the known polar solvents, for example, diisobutyl ketone, methyl isobutyl ketone, hydroxy ethyl acetate, 2-ethoxyethyl acetate, propylene glycol methyl ether, diethyl ether of ethylene glycol, propylene glycol methyl ether, butyl alcohol and isopropyl alcohol. In other words, the solvents are ethers, esters, ketones or alcohols, or mixtures of these with aromatic hydrocarbons such as xylene, the ethers, esters, ketones and alcohols having boiling points of 55° C. to 200° C., generally 120° C. to 160° C.

Among the polyepoxides which can be used in admixture with the polymer are glycidyl polyethers of polyhydric alcohols and polyhydric phenols prepared by reacting the alcohol or phenol with a halohydrin such as epiclorohydrin the presence of an alkali. These are well known epoxide resins described in such patents as U.S. 2,467,171, U.S. 2,538,072, U.S. 2,582,985, U.S. 2,615,007, U.S. 2,698,315, U.S. 2581,464. In addition to epoxy (i.e., oxirane) ethers, epoxy esters are included. Desirable epoxy esters can be made by the epoxidation of unsaturated esters by reaction with a peracid such as peracetic acid or performic acid, desirable esters thus prepared being 3,4-epoxy-cyclo-hexylmethyl-3,4-epoxy-cyclohexane carboxylate and 3,4-epoxy-6-methylcyclohexylmethyl-3,4-epoxy-6-methylcyclohexane carboxylate.

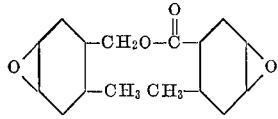

Other epoxy compounds included are, for example

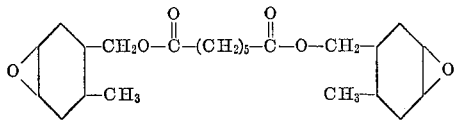

and the diglycidyl ether of trimethylol propane, dicyclopentadiene diepoxide, diglycidyl ester of isophthalic acid, diglycidyl ester of adipic acid, diglycidyl ester of azelaic acid, diglycidyl ester of terephthalic acid, bisepoxydicyclopentyl ether of ethylene glycol and epoxidized drying oils, such as epoxidized soya oil and the like of less than twenty carbon atom acids.

The most advantageous polyepoxide for producing room temperature curable compositions are glycidyl ethers of alcohols and phenols and glycidyl esters of the acids.

The preferred acid level of the carboxy copolymers is about 30 percent. Carboxy copolymers containing as low as 20 percent carboxylic acid monomer can be used and will cure at room temperature such as 20° C. but at 30 percent acid the room temperature curing is considerably faster and therefore more advantageous. Higher acid levels up to about 40 percent and above can also be used and rapid room temperature curing obtained and the only reason for preferring acid levels at about 30 percent is the increased cost of preparing the higher acid content copolymers, the necessity of using more expensive solvents and the decreased pot life of the compositions before application. The acid content of the copolymers is determined by the present carboxylic acid by weight based on the total weight of the copolymer.

The ratio of carboxy copolymer and polyepoxide which can be employed can vary within fairly wide limits depending upon the properties desired of the cured product and can readily be determined by routine experimentation by those skilled in the art. Generally, it is advisable to employ about 0.7 to 2 equivalents of polyepoxide to 1 equivalent of the carboxy copolymer and a ratio of 1 to 1.5 equivalents of the polyepoxide to 1 equivalent of the carboxy copolymer is preferred.

The carboxy copolymer and the polyepoxide are mixed together with a suitable solvent and with a catalyst, formed into the shape desired, such as a coating or film, and allowed to cure at room temperature such as 20° C. or higher. If the coatings are to be cured by heating, a catalyst is not necessary. However, for rapid cures and uniformly cured films, a catalyst is advantageous, preferably at temperatures below 80° C.

The catalyst which is used herein is a bicyclic fused ring amine containing only carbon, hydrogen and nitrogen and having a nitrogen atom in at least one of the bridgehead positions, said nitrogen atom being connected to three different saturated carbon atoms and bearing an unshared pair of electrons. The preferred catalyst is triethylene diamine which has the structural formula:

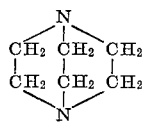

Other amines suitable as catalyst include 1,3-diazabicyclo[2.2.0]hexane,
1,3,5-triazabicyclo[2.2.0]hexane,
1-azabicyclo[2.2.1]heptane,
1-azabicyclo[3.3.1]nonane,
pyrrolizidine(1-azabicyclo[0.3.3]octane),
quinuclidine(1-azabicyclo[2.2.2]octane),
1,3-ethylenepiperidine(1-azabicyclo[3.2.1]octane),
conidine(1-azabicyclo[4.2.0]octane),
1,3-diazabicyclo[2.2.2]octane,
1-azabicyclo[3.2.2]nonane,
1-isogranatanine(1-azabicyclo[3.3.1]nonane),
pentamethylenetetramine(1,3,5,7-tetraazabicyclo-[3.3.1]nonane),
1-azabicyclo[0.3.5]decane,
norlupinane(1-azabicyclo[0.4.4]decane),
sparteine, and the like.

The catalysts are used in catalytic amounts, generally from about 0.1 to about 2 percent or higher, and preferably 0.5 to about 1.5 percent, by weight based on the sum of the weights of the carboxy copolymer and the polyepoxide.

The following examples will serve to illustrate the invention without limiting the same:

EXAMPLE 1

(A) CARBOXY COPOLYMER PREPARATION

| Materials | Wt. percent | Charge, gms. |
| --- | --- | --- |
| Styrene | 30.0 | 300.0 |
| n-Butyl acrylate | 40.0 | 400.0 |
| Acrylic acid | 30.0 | 300.0 |
| Cumene hydroproxide | | 10.0 |
| Xylene | | 500.0 |
| Monoethyl ether of ethylene glycol | | 500.0 |

Into a 3 liter, 3 neck flask fitted with a mechanical agitator, condenser and dropping funnel are charged 333 grams xylene, 333 grams monoethyl ether of ethylene glycol and 10 grams of cumene hydroperoxide. The flask contents are heated to reflux temperature of 125–127° C. The monomers; styrene, acrylic acid, and n-butyl acrylate, are added dropurse at reflux pot temperature of 125–133° C. over a period of 90 minutes. After all of the monomers have been added, the reflux is continued for 6 hours at pot temperatures in the range of 126–132° C. at which time 167 grams xylene and 167 grams monoethyl ether of ethylene glycol are added and the flask contents cooled. The polymer solution has the following properties:

Percent solids=52%
Gardner viscosity=$Z_3$–$Z_4$
Acid value (solids)=192
Gardner color=<1

(B) Cured film preparation

In a suitable container 19.2 grams of the carboxy polymer solution of this example, and 10 grams of bisphenol diglycidyl ether (equivalent epoxide weight 192) [epoxide to carboxyl equivalent ratio 1.25] are combined in the presence of 5.4 grams xylene, 5.4 grams monoethyl ether of ethylene glycol and 1.2 grams triethylene diamine in monoethyl ether of ethylene glycol (25 percent concentration). Films were cast and evaluated as described in Table I below.

EXAMPLE 2

In the same manner as Example 1(B) 22 grams of the carboxy polymer solution of Example 1(A) and 8.6 grams of 3,4-epoxycyclohexylmethyl 3,4-epoxycyclohexane-carboxylate (equivalent epoxide weight 140) [epoxide to carboxyl equivalent ratio 1.25] are combined in the presence of 9.4 grams xylene and 1.2 grams triethylene diamine in monoethyl ether of ethylene glycol (25 percent concentration). Films were cast and evaluated as described in Table I below.

EXAMPLE 3

In the same manner as Example 1(B) 19.2 grams copolymer of Example 1(A) and 10 grams bisphenol diglycidyl ether (equivalent epoxide weight 192) are combined in the presence of 5.4 grams xylene and 5.4 grams monoethyl ether of ethylene glycol and 2.0 grams dibenzyldimethylammonium chloride in monoethyl ether of ethylene glycol (50 percent concentration). Films were cast and evacuated as described in Table I below.

EXAMPLE 4

In the same manner as Example 1(B) 22 grams carboxy polymer solution of Example 1(A) and 8.6 grams 3,4-epoxycyclohexylmethyl 3,4 epoxycyclohexane-carboxylate (equivalent epoxide weight 140) [epoxide to carboxyl equivalent ratio 1.25] are combined in the presence of 9.4 grams xylene and 2.0 grams dibenzyldimethylammonium chloride in monoethyl ether of ethylene glycol (50 percent concentration). Films were cast and evaluated as described in Table I below.

EXAMPLE 5

In the same manner as Example 1(B) 19.2 grams copolymer of Example 1(A) and 10 grams bisphenol diglycidyl ether (equivalent epoxide weight 192) [epoxide to carboxyl equivalent ratio 1.25] are combined in the presence of 5.4 grams xylene, 5.4 grams monoethyl ether of ethylene glycol and 1.0 gram benzyltrimethylammonium methoxide in methanol (40 percent concentration). Films were cast and evaluated as described in Table I below.

EXAMPLE 6

In the same manner as Example 1(B) 22 grams of the carboxy polymer solution of Example 1(A) and 8.6 grams of 3,4 - epoxycyclohexylmethyl 3,4 - epoxycyclohexane-carboxylate (equivalent epoxide weight 140) [epoxide to carboxyl equivalent ratio 1.25] are combined in the presence of 9.4 grams xylene and 1.0 grams benzyltrimethylammonium methoxide in methanol (40 percent concentration). Films were cast and evaluated as described in Table I below.

EXAMPLE 7

In the same manner as Example 1(B) 19.2 grams copolymer of Example 1(A) and 10 grams bisphenol diglycidyl ether (equivalent epoxide weight 192) [epoxide to carboxyl equivalent ratio 1.25] are combined in the presence of 5.4 grams xylene, 5.4 grams monoethyl ether of ethylene glycol and 1.0 gram benzyldimethylamine for triethylene amine. Films were cast and evaluated as described in Table I below.

EXAMPLE 8

In the same manner as Example 1(B) 22 grams of the carboxy polymer solution of Example 1(A) and 8.6 grams of 3,4 - epoxycyclohexylmethyl 3,4 - epoxycyclohexane-carboxylate (equivalent epoxide weight 140) [epoxide to carboxyl equivalent ratio 1.25] are combined in the presence of 9.4 grams xylene and 1.0 gram benzyldimethylamine. Films were cast and evaluated as described in Table I below.

EXAMPLE 9

In the same manner as Example 1(B) 19.2 grams copolymer of Example 1(A) and 10 grams bisphenol diglycidyl ether (equivalent epoxide weight 192) [epoxide to carboxyl equivalent ratio 1.25] are combined in the presence of 5.4 grams xylene, 5.4 grams monoethyl ether of ethylene glycol and 0.5 gram benzyltrimethylammonium chloride in water (60 percent concentration). Films were cast and evaluated as described in Table I below.

EXAMPLE 10

In the same manner as Example 1(B) 22 grams of the carboxy polymer solution of Example 1(A) and 8.6 grams of 3,4 - epoxycyclohexylmethyl 3,4 - epoxycyclohexane-carboxylate (equivalent epoxide weight 140) [epoxide to carboxyl equivalent ratio 1.25] are combined in the presence of 9.4 grams xylene and 0.5 gram benzyltrimethylammonium chloride in water (60 percent concentration). Films were cast and evaluated as described in Table I below.

Standard tests were performed on the films produced from the compositions as described in Example 1(B) through Example 10. The films produced were allowed to age 14 days at 25° C. and were tested as follows:

Tack free time—3 mil film on glass panel.
Pencil hardness—3 mil film on glass panel.
Impact resistance—Gardner reverse impact on 1 mil dry film on tinned plate panels.
Cold water soak—Seven days immersion at 25° C. on films on glass test tubes.
10 percent alkali resistance—films on glass test tubes immersed seven days @ 25° C. in 10 percent aqueous sodium hydroxide.
Xylene resistance—pencil hardness measured on portion of film subjected to xylene soak for 10 minutes.

The results of the tests are tabulated in Table I below.

TABLE I

| Film Compositions | Tack-free time, hrs. | Pencil hardness | Impact, in. lbs. | Xylene resistance | Water soak | 10% NaOH resistance |
|---|---|---|---|---|---|---|
| 1B | 0.5 | F-H | 28+ | 4B | Unaffected | Unaffected. |
| 2 | 10-15 | F-H | 28+ | HB-F | ___do___ | Destroyed. |
| 3 | 3-4 | F-H | 28+ | 4B | Whitening | Unaffected. |
| 4 | 10-15 | F-H | 28+ | HB-F | Blisters | Sl. wrinkling. |
| 5 | 2 | F-H | 28+ | 4B | Unaffected | Whitening. |
| 6 | 24-26 | F-H | 28+ | F-H | ___do___ | Sl. wrinkling. |
| 7 | 4-5 | F-H | 28+ | 4B | ___do___ | Def. whitening. |
| 8 | 50-60 | F-H | 28+ | 4B | ___do___ | Destroyed. |
| 9 | 8-10 | F-H | 28+ | 4B | ___do___ | Unaffected. |
| 10 | 12-14 | F-H | 28+ | F-H | ___do___ | Destroyed. |

Further evaluation was made of the films in Table I of examples 1(B) through 4. These film compositions were exposed outdoors for 12 months in Miami, Fla. The evaluations were standard and the rating ranged between 0 which is a complete failure to 10 which is perfect. Table II describes these results.

TABLE II

| Example | Blister | Yellowing | Gloss | Mildew | Peeling | Rusting | Chalking | Dirt pick-up | Gen'l Appearance |
|---|---|---|---|---|---|---|---|---|---|
| 1B | 6 | 6 | 8 | 8 | 6 | 6 | 10 | 7 | 1 |
| 2 | 10 | 10 | 8 | 8 | 8 | 10 | 10 | 7 | 7 |
| 3 | 6 | 5 | 8 | 8 | 1 | 5 | 10 | 7 | 0 |
| 4 | 7 | 10 | 8 | 8 | 10 | 7 | 10 | 7 | 6 |

In comparing the results of triethylene diamine as a catalyst, in the various carboxy polymer-epoxide compositions, the films produced using the glycidyl polyethers of polyhydric phenols or alcohols offered the distinct advantage of faster tack free time in combination with excellent resistance properties and an additional advantage in exterior durability properties over catalysts such as quaternary ammonium compounds and other amines. The glycidyl esters of carboxylic acid epoxy esters when prepared using triethylene diamine as the catalyst had an advantage over the compared catalysts in exterior exposure (no rusting) and, also, in water and alkali resistance.

The two catalysts close to triethylene diamine in effectivness were the quaternary ammonium compounds, dibenzyldimethylammonium chloride and benzyltrimethylammonium chloride. These quaternary ammonium compounds have the disadvantage in that both catalysts in carboxyepoxy compositions tend to crystallize from a solution on standing whereas no such tendency has been observed with the triethylene diamine catalyst.

It is to be understood that the foregoing detailed description is given merely by way of illustration and that many variations may be made therein without departing from the spirit of the invention.

The embodiments of the invention in which an exclusive property or privilege is claimed are defined as follows:

1. A method for preparing a composition capable of curing at low temperatures in the range from about room temperature to about 80° C. which comprises blending a carboxy containing copolymer which is a polymerization product of an alpha-beta monoethylenically unsaturated monocarboxylic acid having not more than four carbon atoms and a monoethylenically unsaturated monomer copolymerizable therewith and containing about 20 to about 40 weight percent carboxylic acid based on the total copolymer weight; a polyepoxide containing more than one 1,2-epoxide group per molecule and being selected from at least one member of the group consisting of clycidyl polyethers of polyhydric phenols, glycidyl polyethers of polyhydric alcohols, glycidyl esters of carboxylic acid and epoxy esters; and from about 0.1 to about 2 percent by weight based on the sum of the weights of the carboxy copolymer and the polyepoxide of a bicyclic fused amine containing only carbon, hydrogen and nitrogen and having a nitrogen atom in at least one of the bridgehead positions, said nitrogen atom being connected to three different saturated carbon atoms and bearing an unshared pair of electrons; said carboxy containing copolymer and polyepoxide present in the proportions of 1 carboxy equivalent to about 0.7 to 2 epoxy equivalents.

2. The process of claim 1 wherein the catalyst is triethylenediamine.

3. The process of claim 2 wherein the percent of carboxylic acid ranges from 20 to 30 percent.

4. The process of claim 2 wherein the carboxy containing copolymer and polyepoxide present are in the proportions of 1 carboxy equivalent to about 1 to 1.5 epoxy equivalents.

5. The process of claim 2 in which the unsaturated acid is acrylic acid, the unsaturated monomer copolymerizable therewith is a mixture of styrene and butyl acrylate and the polyepoxide is a diglycidyl ether of a dihydric phenol.

References Cited
UNITED STATES PATENTS

| | | | |
|---|---|---|---|
| 3,366,718 | 1/1968 | Komada | 264—257 |
| 3,396,641 | 8/1968 | Welty | 94—?? |

PAUL LIEBERMAN, Primary Examiner

U.S. Cl. X.R.

260—33.2, 47, 836